Figure 1:
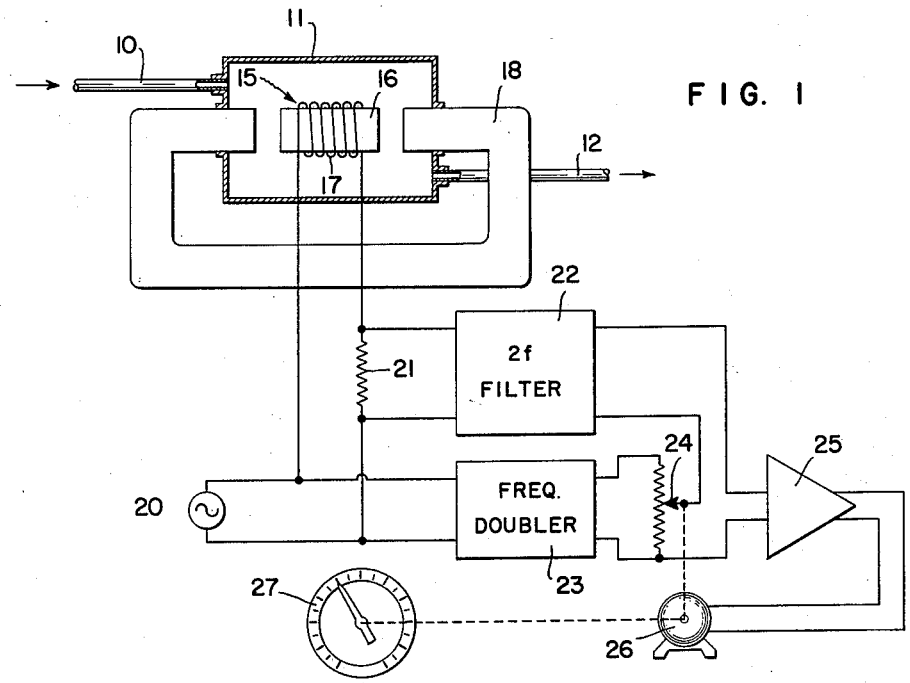

March 29, 1960  J. VOLLMER  2,930,970

MEASURING APPARATUS

Filed Sept. 19, 1955

INVENTOR.
JAMES VOLLMER
BY *Henry L. Hanson*
ATTORNEY.

United States Patent Office 2,930,970
Patented Mar. 29, 1960

2,930,970

MEASURING APPARATUS

James Vollmer, Philadelphia, Pa., assignor to Minneapolis-Honeywell Regulator Company, Minneapolis, Minn., a corporation of Delaware Application September 19, 1955, Serial No. 535,043

8 Claims. (Cl. 324—36)

A general object of the present invention is to provide a new and improved paramagnetic gaseous analyzing apparatus. More specifically, the invention relates to a gaseous analyzing apparatus which is characterized by its ability to respond to variations in the oxygen content present in a gaseous atmosphere under examination.

It has been found that the electrical reluctance of any particular gaseous atmosphere varies in accordance with the amount of oxygen present in the atmosphere. It is further known that if a magnetic circuit is provided with a source of constant magnetomotive force, variations in the reluctance of a portion of the magnetic circuit will produce a change in the flux present in the circuit. The present invention as an oxygen detector relies upon the fact that the reluctance of a magnetic circuit and thereby the flux in the circuit may be varied by the oxygen content of a gas placed in the magnetic circuit.

It is therefore a further object of the present invention to provide an improved oxygen detecting apparatus wherein an oxygen bearing atmosphere is used to vary the reluctance of a magnetic circuit to produce flux variations in the circuit which are indicative of the oxygen concentration in the gas.

As the reluctance variations due to oxygen variations is relatively small, these reluctance variations may be detected by means of a highly sensitive flux responsive device, such as a second-harmonic magnetic modulator known generally as magnettor. The magnettor is characterized by its ability to produce an output second harmonic signal from an input fundamental signal in accordance with the magnitude of magnetic flux unbalance applied to the core of the magnettor.

Accordingly, it is another object of the present invention to provide an improved oxygen analyzer for a gas comprising a magnetic circuit having a magnettor therein and a variable reluctance path whose reluctance is adapted to be variable in accordance with variations in oxygen concentration of a gaseous atmosphere.

Still another object of the present invention is to provide an oxygen analyzer utilizing a permanent magnet as a source of constant magnetomotive force for supplying flux to a magnetic circuit and where the flux in the magnetic circuit is adapted to be varied by an oxygen bearing atmosphere which varies the reluctance of the magnetic circuit.

A still further object of the present invention is to provide an improved gaseous analyzing apparatus utilizing a magnettor positioned in a balanced flux field of a magnetic circuit and wherein the flux balance may be upset by means of an oxygen bearing atmosphere which varies the reluctance of a portion of the associated magnetic circuit.

The present invention is further characterized by its freedom from moving parts in the detector apparatus as well as its substantial instantaneous response to changes in oxygen concentration. These features are highly desirable for continuous analysis purposes and adapts the detector unit for use in a closed loop servo control without introducing appreciable time lags in the control loop.

The various features of novelty which characterize the invention are pointed out with particularity in the claims annexed to and forming a part of this specification. For a better understanding of the invention, its advantages, and specific objects attained with its use, reference should be had to the accompanying drawings and descriptive matter in which there is illustrated and described a preferred embodiment of the invention.

Figure 2:
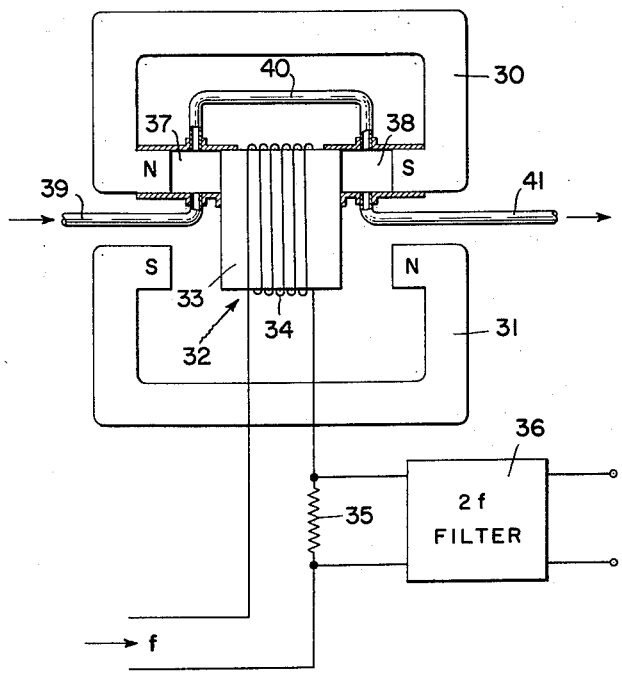

Of the drawings:

Fig. 1 shows a diagrammatic arrangement of a basic form of the present invention; and Fig. 2 shows a modification of the apparatus wherein the flux normally applied to the flux detecting element is balanced so that the device is a null type detector.

Referring first to Fig. 1, the numeral 10 represents an inlet conduit to a chamber 11. Conduit 10 is adapted to be supplied by means of some gaseous atmosphere source which has an oxygen concentration therein which is to be measured. The output from the chamber 11 is by way of a conduit 12.

Positioned within the chamber 11 is a second-harmonic magnetic modulator known as a magnettor 15. The magnettor comprises a core member 16 with a coil 17 wound therearound. The magnettor is positioned in the magnetic field of a permanent magnet 18 so that the flux lines from the magnet 18 will pass through the core 16. The core 16 is arranged so that there is a gap between the ends of the core 16 and the pole ends of the magnet 18.

The coil 17 is adapted to be driven by an alternating current source 20 having a fundamental frequency of a desired value and substantially no harmonic signals present therein. Connected in series with the supply lines to the coil 17 is a resistor 21. The resistor 21 is in turn connected to the input of a second harmonic filter 22. The source 20 is also connected to a suitable frequency doubler 23 whose output signal will be a second harmonic signal. The frequency doubler output is applied to a potentiometer 24. The potentiometer 24 is in turn connected to a servo amplifier 25 so that the signal from the output of the filter 22 may be selectively compared to the signal from the potentiometer 24. A motor 26 is connected to the output of the amplifier 25 and this motor in turn will adjust the potentiometer 24 until a desired balance condition exists on the input of the amplifier 25. The motor may also be arranged to position an indicator mechanism 27. In addition, the motor 26 may be used in any well known manner to effect the regulation of the gas coming into the conduit 10.

In considering the operation of the apparatus of Fig. 1, it should first be noted that the magnettor is positioned in the flux field of the permanent magnet 18. The magnet 18 is assumed to be of the type producing a constant magnetomotive force so that the flux which will be passing through the core 16 of the magnettor 15 will be a function of the reluctance of the magnetic circuit which includes the permanent magnet 18, the core 16, and the space between the core 16 and the pole ends of the magnet 18. The magnettor 15 is effective to distort the applied fundamental signal from the source 20 and produce a second harmonic signal, either in the supply circuit, or in an auxiliary winding wound on the core 16, which is of a phase depending upon the direction of the flux in the core 16 and of a magnitude dependent upon the magnitude of the flux passing through the core 16.

For any particular oxygen concentration in the atmosphere within the chamber 10, there will be a corresponding reluctance in the magnetic circuit so that the flux present in the circuit will be dependent upon that reluctance.

The circuit shown in Fig. 1 is arranged so that it will always have a second harmonic signal present due to the fact that there will always be an unbalance flux existing in the core 16.

The second harmonic signal as well as the fundamental signal will appear across the resistor 21 and will be applied to the second harmonic filter 22. The output of the filter 22 will be compared with the output of the frequency doubler 23 on the input of the amplifier 25 and the amplifier will cause the motor 26 to reposition the potentiometer 24 so that there is a balance between the two signals. The adjustment necessary to effect a balance will be indicative of the oxygen concentration in the gaseous atmosphere within the chamber 11.

If the oxygen concentration in the chamber 11 should increase, the reluctance of the air gap between the core 16 and the pole ends of the magnet 18 will decrease. With a decrease in the reluctance, there will be an increase in the flux and this will produce an increased output signal insofar as the second harmonic from the magnettor 15 is concerned. The increase in the second harmonic signal from the magnettor 15 will be felt on the input of the amplifier 25 and motor 26 will readjust the potentiometer 24 to a new balance position.

If the oxygen concentration within the chamber 11 should decrease, the reluctance of the gap between the core 16 and the pole ends 18 will increase so that the flux applied to the core 16 will decrease. The decrease will produce a decreased amplitude in the second harmonic signal present and this will again be applied to the input of the amplifier by way of the filter 22 and the motor 26 will be readjusted until the potentiometer output signal balances the change in the output signal from the filter 22.

Figure 2

The apparatus disclosed in Fig. 2 is basically the same as that of Fig. 1 with the exception that in Fig. 2 the unidirectional magnetic flux applied to the magnettor by the permanent magnet is normally balanced so that there is no net unidirectional flux present in the magnettor. Under these circumstances, there will be no output signal in the form of a second harmonic present in the magnettor.

Considering Fig. 2 more specifically, the detector apparatus comprises a pair of permanent magnets 30 and 31. These magnets are so arranged that their adjacent pole faces are of opposite polarity. Positioned within the space between the pole faces of the magnets 30 and 31 is a magnettor 32 which comprises a core 33 having a coil 34 wound thereon. In series with the coil 34 is a resistor 35 across which it is desired to produce both the fundamental signal and any second harmonic signal originating from the magnettor 32. The fundamental is filtered out by means of the filter 36 so that only a second harmonic signal will appear on the output of the filter.

For varying the reluctance of a portion of the magnetic circuit associated with the core 33 there is provided an enclosure 37 and a further enclosure 38. The enclosure 37 is supplied by way of a conduit 39 and this enclosure in turn is fed by way of a conduit 40 to the enclosure 38. The outlet from enclosure 38 is by way of a conduit 41.

In considering the operation of the detector shown in Fig. 2, it should first be noted that in the absence of a reluctance in the magnetic circuit including the permanent magnet 30 different from the reluctance in the magnetic circuit including the magnet 31, the sum of the unidirectional fluxes passing through the core 33 of the magnettor 32 will be zero. There will be a multiplicity of paths for the flux of the two magnetic circuits formed by the magnets 30 and 31. One path may be traced from the north pole of the magnet 30 through the core 33 to the south pole of the magnet 30. Another path may be traced from the north pole of the magnet 31. It will be noted that these flux paths are in the opposite direction through the core 32 so that with a balanced reluctance in each magnetic circuit, there will be a balanced magnetomotive force from each of the magnets 30 and 31 to thereby produce a balance of fluxes in the core 33.

Another magnetic circuit may be traced from the north pole of the magnet 30 through the core 33 to the south pole of the magnet 31 and thence from the north pole of the magnet 31 through the core 33 to the south pole of the magnet 30. As before, the flux directions passing through the core 33 are opposite so that there is zero net unidirectional flux present in the core 33.

When an oxygen bearing atmosphere is passed through the conduit 39 into the chambers 37 and 38, the reluctance of the magnetic circuit of the magnet 30 will be decreased and there will be a resultant unbalance in the fluxes in the core 32. With an unbalance flux existing in the core 32, the magnettor 32 will produce an output second harmonic signal indicative of the magnitude of the flux unbalance and this will be applied to the second harmonic filter 36. The output of the filter 36 may be used in any desired manner, such as the circuit shown in Fig. 1, to indicate the oxygen concentration of the gas passing through the chambers 37 and 38. If the oxygen concentration in the chambers 37 and 38 should drop below the ambient oxygen concentration present between the north and south poles of the magnet 31, the direction of the flux unbalance in the core 33 will reverse and there will be a consequent reversal in the phase of the second harmonic signal appearing in the output of the filter 36. As before, the magnitude of the second harmonic signal will be a direct function of the flux unbalance in the core 33.

While, in accordance with the provisions of the statutes, there has been illustrated and described the preferred embodiments of the invention, it will be apparent to those skilled in the art that changes may be made in the forms of the apparatus disclosed without departing from the spirit of the invention as set forth in the appended claims, and that in some cases, certain features of the invention may be used to advantage without a corresponding use of other features.

Having now described the invention, what is claimed as new and for which it is desired to secure by Letters Patent is:

1. A gas analyzer comprising a magnetic member having a pair of poles of opposite polarity and having a substantially constant magnetomotive force, a magnetic flux responsive member positioned between said poles, a coil wound on said flux responsive member and adapted to be energized by an alternating current source, said coil producing in an associated electrical circuit a signal of twice the frequency of said alternating current source upon a magnetic flux unbalance in said flux responsive member, and means for varying the reluctance of the magnetic circuit formed by said magnetic member and said flux responsive member comprising means to bring a paramagnetic gas of varying composition into physical association with the magnetic flux path defined by said magnetic member.

2. An oxygen analyzer comprising a second-harmonic magnetic modulator, a magnetic circuit having a source of magnetic flux therein and including said modulator as an element, a chamber enclosing at least a portion of said magnetic circuit and adapted to vary the reluctance of the magnetic circuit in accordance with the oxygen concentration therein, and means connected to said modulator to indicate flux variations in said magnetic circuit caused by variations in the oxygen concentration.

3. Apparatus for use in an oxygen analyzer comprising a magnetic circuit, a source of substantially constant magnetomotive force connected in said circuit, a second-harmonic magnetic modulator positioned in said circuit and responsive to the flux variations therein, and a variable reluctance path in said circuit comprising means defining a space and means for introducing an oxygen bearing gas therein, said path effecting variations in the flux in said circuit in accordance with the variations in the oxygen concentration in said space.

4. Apparatus for use in an oxygen analyzer comprising a magnetic circuit, a source of substantially constant magnetomotive force connected in said circuit, a flux responsive member having an input coil adapted to be energized by an alternating current signal and produce a second harmonic signal whose magnitude is dependent upon the flux magnitude, and a variable reluctance path in said circuit comprising means defining a space and means for introducing an oxygen bearing gas therein, said path effecting variations in the flux in said circuit in accordance with variations in the oxygen concentration in said space.

5. Apparatus as defined in claim 4 wherein said source of magnetomotive force comprises a permanent magnet.

6. Apparatus as defined in claim 4 wherein said source of magnetomotive force comprises a pair of flux producing members positioned relative to said flux responsive member to produce a net zero flux in the flux responsive member in the absence of an unbalance due to variations in said variable reluctance path.

7. An oxygen analyzing apparatus comprising a source of constant magnetomotive force comprising a C shaped magnet having two adjacent pole faces, a second-harmonic magnetic modulator positioned between said pole faces and responsive to the flux between said pole faces, and means for varying the reluctance of the magnetic circuit formed by said magnet comprising a variable reluctance path, said path including a space having an oxygen bearing gas therein.

8. An oxygen analyzing apparatus comprising a source of magnetomotive force comprising a pair of permanent magnets each having a pair of poles positioned adjacent the poles of the other, a second-harmonic magnetic modulator positioned betwen the pole pairs of both of said magnets so that the net flux from said magnets will be balanced, and means for varying the reluctance of the space between the poles of one of said magnets comprising a space adapted to be filled with an oxygen bearing gas.

References Cited in the file of this patent

UNITED STATES PATENTS

| | | |
|---|---|---|
| Re. 23,950 | Bloch et al. | Feb. 22, 1955 |
| 1,360,326 | Slepian | Nov. 30, 1920 |
| 2,226,275 | Abbott et al. | Dec. 24, 1940 |
| 2,476,304 | Kells et al. | July 19, 1949 |
| 2,625,584 | Kells | Jan. 13, 1953 |
| 2,642,479 | Jones | June 16, 1953 |